US012223668B2

(12) United States Patent
Yang et al.

(10) Patent No.: US 12,223,668 B2
(45) Date of Patent: Feb. 11, 2025

(54) CONTOUR SHAPE RECOGNITION METHOD

(71) Applicant: SOOCHOW UNIVERSITY, Jiangsu (CN)

(72) Inventors: Jianyu Yang, Jiangsu (CN); Ruipeng Min, Jiangsu (CN); Yao Huang, Jiangsu (CN)

(73) Assignee: SOOCHOW UNIVERSITY, Suzhou Jiangsu (CN)

( * ) Notice: Subject to any disclaimer, the term of this patent is extended or adjusted under 35 U.S.C. 154(b) by 395 days.

(21) Appl. No.: 17/790,020

(22) PCT Filed: May 13, 2021

(86) PCT No.: PCT/CN2021/093615
§ 371 (c)(1),
(2) Date: Jun. 29, 2022

(87) PCT Pub. No.: WO2022/028031
PCT Pub. Date: Feb. 10, 2022

(65) Prior Publication Data
US 2023/0047131 A1 Feb. 16, 2023

(30) Foreign Application Priority Data
Aug. 5, 2020 (CN) .......................... 202010777341.5

(51) Int. Cl.
*G06T 7/50* (2017.01)
*G06T 7/62* (2017.01)
(Continued)

(52) U.S. Cl.
CPC .................. *G06T 7/50* (2017.01); *G06T 7/62* (2017.01); *G06V 10/462* (2022.01);
(Continued)

(58) Field of Classification Search
CPC ............ G06T 7/50; G06T 2207/10024; G06T 2207/20164; G06T 7/60; G06T 7/62;
(Continued)

(56) References Cited

U.S. PATENT DOCUMENTS

2017/0206431 A1    7/2017  Sun et al.

FOREIGN PATENT DOCUMENTS

| CN | 107103323 A | 8/2017 |
| CN | 107203742 A | 9/2017 |

(Continued)

*Primary Examiner* — Gandhi Thirugnanam
*Assistant Examiner* — Michael Adam Shariff
(74) *Attorney, Agent, or Firm* — NKL Law; Jae Youn Kim

(57) ABSTRACT

Provided is a contour shape recognition method, including: sampling and extracting salient feature points of a contour of a shape sample; calculating a feature function of the shape sample at a semi-global scale by using three types of shape descriptors; dividing the scale with a single pixel as a spacing to acquire a shape feature function in a full-scale space; storing feature function values at various scales into a matrix to acquire three types of feature grayscale map representations of the shape sample in the full-scale space; synthesizing the three types of grayscale map representations of the shape sample, as three channels of RGB, into a color feature representation image; constructing a two-stream convolutional neural network by taking the shape sample and the feature representation image as inputs at the same time; and training the two-stream convolutional neural network, and inputting a test sample into a trained network model to achieve shape classification.

8 Claims, 6 Drawing Sheets

(51) Int. Cl.
  *G06V 10/46* (2022.01)
  *G06V 10/74* (2022.01)
  *G06V 10/764* (2022.01)
  *G06V 10/82* (2022.01)
(52) U.S. Cl.
  CPC .......... *G06V 10/761* (2022.01); *G06V 10/764* (2022.01); *G06V 10/82* (2022.01); *G06T 2207/10024* (2013.01); *G06T 2207/20081* (2013.01); *G06T 2207/20164* (2013.01)
(58) Field of Classification Search
  CPC  G06T 2207/20081; G06T 2207/20084; G06V 10/761; G06V 10/764; G06V 10/462; G06V 10/82
  See application file for complete search history.

(56) References Cited

FOREIGN PATENT DOCUMENTS

| | | | | |
|---|---|---|---|---|
| CN | 110991465 A | * | 4/2020 | ........... G06K 9/3233 |
| CN | 111898621 A | | 11/2020 | |

* cited by examiner

CONTOUR SHAPE RECOGNITION METHOD

TECHNICAL FIELD

The present invention relates to a contour shape recognition method, and belongs to the field of shape recognition technologies.

BACKGROUND

Contour shape recognition is an important research direction in the field of machine vision. One of the main research topics in the machine vision is to carry out target recognition by using the shape features of an object, with the main achievement as fully extracting target shape features by improving a shape matching algorithm or designing an effective shape descriptor, so as to perform better similarity measurement. This has been widely applied in engineering, e.g., radar, infrared imaging detection, image and video matching and retrieval, robot self-navigation, scene semantic segmentation, texture recognition, and data mining.

Generally, for the representation and retrieval of contour shapes, target contour features are extracted based on manually designed shape descriptors, such as Shape Contexts, Shape Vocabulary and Bag of contour fragments. However, the shape information extracted by means of the manual descriptors is usually incomplete, and cannot guarantee insensitivity to local changes, blockage, overall deformation, and other changes of a target shape. Furthermore, adding too many descriptors would lead to redundant feature extraction and high computational complexity. As a result, the recognition accuracy and efficiency are low. In recent years, as convolutional neural networks have achieved good results in image recognition tasks, they have begun to be applied in shape recognition tasks. However, since the contour shape lacks surface texture, color, and other information of an image, the recognition effect would be low if the convolutional neural network is directly applied.

In view of the above problems of the shape recognition algorithm, how to provide a target recognition method that can comprehensively represent the shape of the target contour while performing accurate classification is an urgent problem to be solved by those skilled in the art at present.

SUMMARY

The present invention is provided to solve the problems in the prior art, and the technical solution is as follows.

A contour shape recognition method includes the following steps:

step 1, sampling and extracting salient feature points of a contour of a shape sample;

step 2, calculating a shape feature function of the shape sample at a semi-global scale by using three types of shape descriptors;

step 3, dividing the scale with a single pixel as a spacing to acquire a shape feature function in a full-scale space;

step 4, storing shape feature function values at various scales into a matrix to acquire three types of shape feature grayscale map representations of the shape sample in the full-scale space;

step 5, synthesizing the three types of shape feature grayscale map representations of the shape sample, as three channels of RGB, into a color feature representation image;

step 6, constructing a two-stream convolutional neural network by taking the shape sample and the color feature representation image as inputs at the same time; and step 7, training the two-stream convolutional neural network, and inputting a test sample into a trained network model to achieve classified recognition of the contour shape.

Preferably, in step 1, extracting the salient feature points of the contour of the shape sample is that:

the contour of each shape sample is composed of a series of sampling points, and for any shape sample S, $$S=\{p_x(i),p_y(i)|i\in[1,n]\},$$

wherein $p_x(i), p_y(i)$ indicates coordinates of a contour sampling point $p(i)$ in a two-dimensional plane, and n indicates the length of the contour;

the salient feature points are extracted by evolving a contour curve of the shape sample, and during each evolution process, a point that contributes the least to target recognition is deleted, wherein the contribution of each point $p(i)$ is defined as:

$$K(i) = \frac{B(i) \cdot b(i, i-1) \cdot b(i, i+1)}{(b(i, i-1) + b(i, i+1))},$$

wherein $b(i,i-1)$ indicates the length of a curve between points $p(i)$ and $p(i-1)$, $b(i,i+1)$ indicates the length of a curve between points $p(i)$ and $p(i+1)$, $B(i)$ indicates an angle between a line segment $p(i)p(i-1)$ and a line segment $p(i)p(i+1)$, the length b is normalized according to the perimeter of the contour, and the larger the value of $K(i)$ the greater the contribution of the point $p(i)$ to a shape feature;

in order to avoid extracting too many or too few salient feature points of the contour, a region-based adaptive end function $F(t)$ is introduced:

$$F(t) = \frac{n_0 \sum_{k=1}^{t} |S_i - S_{i-1}|}{S_0},$$

wherein $S_0$ is the area of an original shape. $S_t$ is an area resulting from t times evolutions, and n0 indicates the total number of points on the contour of the original shape; and after the value of the end function $F(t)$ exceeds a set threshold, extracting the salient feature points of the contour ends.

Further, in step 2, a method for calculating the shape feature function of the shape sample in the semi-global scale specifically includes:

using three types of shape descriptors M:

$$M=\{s_k(i),l_k(i),c_k(i)|k\in[1,m],i\in[1,n]\},$$

wherein $s_k$, $l_k$, $c_k$ are three invariants, namely, a normalized area s, a normalized arc length l, and a normalized barycentric distance c, at a scale k, k is a scale label, and m is the total number of scales; defining descriptors of the three shape invariants respectively:

making a preset circle $C_1(i)$ with an initial radius $$r_1 = \frac{\sqrt{S_0}}{2}$$

by taking the contour sampling point p(i) as a circle center, i.e., a target contour point, wherein the preset circle is an initial semi-global scale of the target contour point; after the preset circle $C_1(i)$ is acquired, calculating the three types of shape descriptors as follows:

in the case of calculating a $s_1(i)$ descriptor, denoting the area of a region $Z_1(i)$, which has a direct connection relationship with the target contour point p(i), in the preset circle $C_1(i)$ as $s_1*(i)$, then:

$$s_1*(i) = \int_{C_1(i)} B(Z_1(i),x)dx,$$

wherein $B(Z_1(i),x)$ is an indicator function, which is defined as $$B(Z_1(i), x) = \begin{cases} 1, & \text{if } x \text{ is inside } Z_1(i) \\ 0, & \text{if } x \text{ is outside } Z_1(i) \end{cases},$$

a ratio of the area of $Z_1(i)$ to the area of the preset circle $C_1(i)$ is used as an area parameter $s_1(i)$ for a multiscale invariant descriptor of the target contour point p(i):

$$s_1(i) = \frac{s_1^*(i)}{(\pi r_1^2)},$$

wherein a value range of $s_1(i)$ should be between 0 and 1;

when calculating a $c_1(i)$ descriptor, firstly calculating a barycenter of a region having a direct connection relationship with the target contour point p(i), to be specific, averaging coordinate values of all pixel points in the region, and the obtained result is the coordinate values of the barycenter of the region, which can be expressed as:

$$w_1(i) = \frac{\int_{C_1(i)} B(Z_1(i), x)xdx}{\int_{C_1(i)} B(Z_1(i), x)dx},$$

wherein $w_1(i)$ indicates the barycenter of the region, then, calculating a distance $c_1*(i)$ between the target contour point p(i) and the barycenter $w_1(i)$, which can be expressed as, $$c_1*(i) = \|p(i) - w_1(i)\|,$$

finally, using a ratio of the radius of $c_i*(i)$ to the radius of the preset circle $C_1(i)$ of the target contour point p(i) as a barycenter parameter $c_1(i)$ of the multiscale invariant descriptor of the target contour point p(i):

$$c_1(i) = \frac{c_1^*(i)}{r_1},$$

wherein the value range of $c_1(i)$ should be between 0 and 1;

when calculating a $l_1(i)$ descriptor, denoting the length of an arc segment which is in the preset circle $C_1(i)$ and has a direct connection relationship with the target contour point p(i) as $l_1*(i)$, and using a ratio of $l_1*(i)$ to a circumference of the preset circle $C_1(i)$ as an arc length descriptor $l_1(i)$ of the target contour point p(i):

$$l_1(i) = \frac{l_1^*(i)}{(2\pi r_1)},$$

wherein the value range of $l_1(i)$ should be between 0 and 1;

calculating to acquire the shape feature function of the shape sample S at the semi-global scale having a scale label k=1 and an initial radius $$r_1 = \frac{\sqrt{S_0}}{2}:$$

$$M_1 = \{s_1(i), l_1(i), c_1(i) | i \in [1,n]\}$$

Further, in step 3, a method for calculating the shape feature function of the shape sample in the full-scale space specifically includes:

selecting a single pixel as a continuous scale change spacing in the full-scale space since a digital image takes one pixel as the smallest unit, that is, for a kth scale label, setting a radius $r_k$ of a circle $C_k(i)$:

$$r_k = \frac{\sqrt{S_0}}{2} \times \frac{m - (k-1)}{m},$$

that is, in the case of an initial scale k=1, $$r_1 = \frac{\sqrt{S_0}}{2},$$

and thereafter, reducing the radius $r_k$ for m−1 times at an equal amplitude by taking one pixel as a unit, until reaching the smallest scale k=m; and calculating to acquire the shape feature functions of the shape sample S at all scales:

$$M = \{s_k(i), l_k(i), c_k(i) | k \in [1,m], i \in [1,n]\}.$$

Further, in step 4, the shape feature functions at various scales are respectively stored into the matrix, and are combined in a continuous scale change order to acquire the three types of shape feature grayscale map representations of the shape sample in the full-scale space:

$$G = \{s, l, c\}$$

wherein s, l, c each indicate a grayscale matrix with a size of m×n,

Further, in step 5, the three types of shape feature grayscale map representations of the shape sample are synthesized, as the three channels of RGB, into a color feature representation image, which acts as tensor representation $T_{m \times n \times 3}$ of the shape sample S, wherein $$\begin{cases} T_{m \times n \times 1} = s_{m \times n} \\ T_{m \times n \times 2} = l_{m \times n} \\ T_{m \times n \times 3} = c_{m \times n} \end{cases}.$$

Further, in step 6, a structure for constructing the two-stream convolutional neural network includes a two-stream input layer, a pre-training layer, fully connected layers and an output layer, wherein the pre-training layer is composed of the first four modules of a VGG16 network model, and parameters acquired after the four modules are trained in an imagenet data set are used as initialization parameters, and three fully connected layers are connected after the pre-training layer;

in the pre-training layer, a first module specifically includes two convolution layers and one maximum pooling layer, wherein each of the convolution layers has 64 convolution kernels, with a size of 3×3, and the pooling layer has a size of 2×2; a second module specifically includes two convolution layers and one maximum pooling layer, wherein each of the convolution layers has 128 convolution kernels, with a size of 3×3, and the pooling layer has a size of 2×2; a third module specifically includes three convolution layers and one maximum pooling layer, wherein each of the convolution layers has 256 convolution kernels, with a size of 3×3, and the pooling layer has a size of 2×2; a fourth module specifically includes three convolution layers and one maximum pooling layer, wherein each of the convolution layers has 512 convolution kernels, with a size of 3×3, and the pooling layer has a size of 2×2; a calculation formula for each convolution layer is:

$$C_O = \phi_{relu}(W_C \cdot C_I + \theta_C),$$

wherein $\phi_{tan\ h}$ is a relu activation function, $\theta_C$ is a bias vector of the convolutional layer, $W_C$ is a weight of the convolutional layer, $C_I$ is an input of the convolutional layer, and $C_O$ is an output of the convolutional layer;

a module of the fully connected layers specifically includes three fully connected layers, wherein a first fully connected layer contains 4096 nodes, a second fully connected layer contains 1024 nodes, a third fully connected layer contains N nodes, with N representing the number of types contained in a sample data set, and a calculation formula for the first two fully connected layers is:

$$F_O = \phi_{tan\ h}(W_F \cdot F_I + \theta_F),$$

wherein $\phi_{tan\ h}$ is a tan h activation function, $\theta_F$ is a bias vector of the fully connected layers, $W_F$ is a weight of the fully connected layers, $F_I$ is an input of the fully connected layers, and $F_O$ is an output of the fully connected layers;

the last fully connected layer is an output layer, has an output calculated with a formula as follows:

$$Y_O = \phi_{softmax}(W_Y \cdot Y_I + \theta_Y),$$

wherein $\phi_{softmax}$ is a softmax activation function. $\theta_Y$ is a bias vector of the output layer. $W_Y$ is a weight of the output layer, $Y_I$ is an input of the output layer, and $Y_O$ is an output of the output layer; and each neuron of the output layer represents a corresponding shape category.

Further, in step 7, a method for achieving classified recognition of the contour shape specifically includes: inputting all training samples into the two-stream convolutional neural network to train the two-stream convolutional neural network model; inputting the test sample into the trained two-stream convolutional neural network model; and determining a shape category, corresponding to a maximum value among output vectors, as a shape type of the test sample, thereby achieving the classified recognition of the contour shape.

The present invention provides a novel method for contour shape representation, and designs a novel method for shape classification by using a two-stream convolutional neural network; the provided contour shape representation is based on the capture of a target feature in a full-scale space, and this feature vector representation is simple and is suitable for performing target classification by using the convolutional neural network; and by means of the continuous convolution calculation of the neural network, the features of each sampling point in the full-scale space are extracted, and meanwhile, a feature relationship between adjacent sampling points is captured. Compared with the method in the background art where only corresponding salient point features are calculated and compared for matching, the present invention can provide more comprehensive comparison for all the information represented by the original shape; the provided two-stream convolutional neural network model makes full use of the feature information represented by the descriptors in the full-scale space, and also makes use of the original information of an original target for assistance, which effectively increases the discriminability in the target description of a shape.

DETAILED DESCRIPTION

The technical solutions in the embodiments of the present invention will be described clearly and completely below in conjunction with the accompanying drawings in the embodiments of the present invention. Obviously, the embodiments described are merely some instead of all of the embodiments of the present invention. Based on the embodiments in the present invention, any other embodiments acquired by a person of ordinary skills in the art without making creative efforts shall fall within the protection scope of the present invention.

Figure 1:
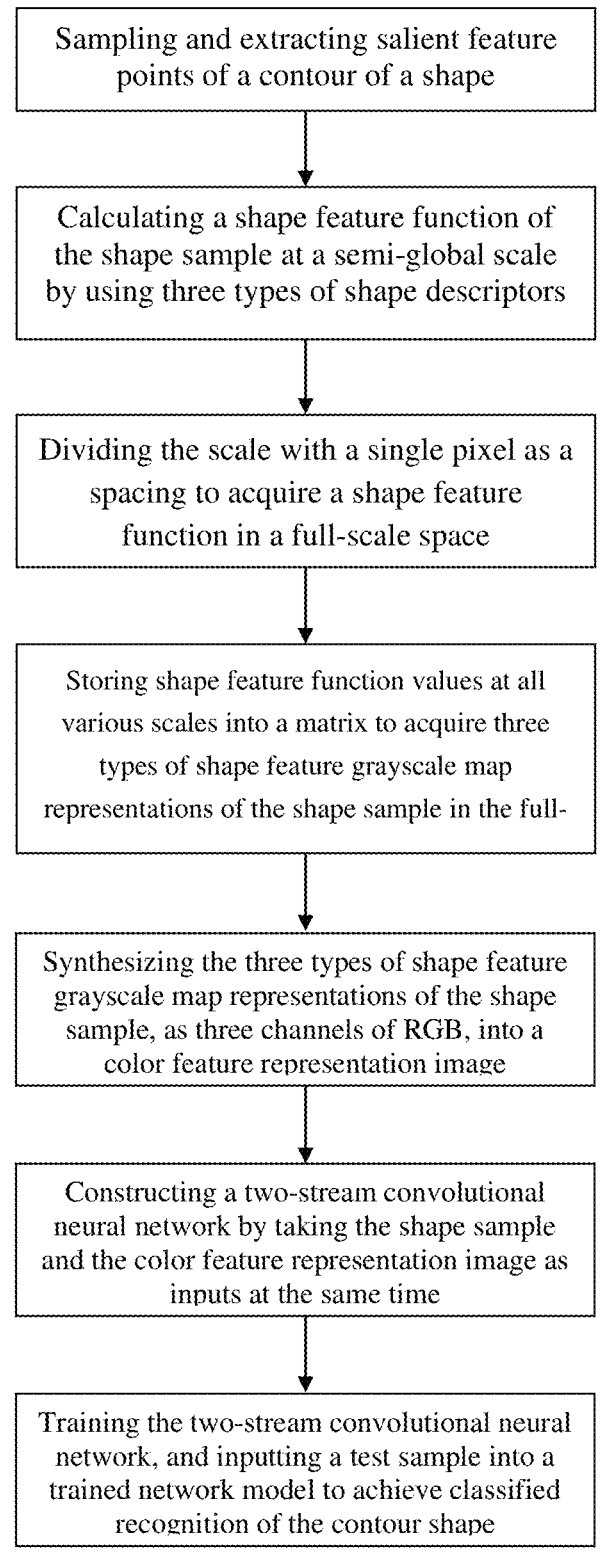
FIG. 1 is a working flow chart of a contour shape recognition method according to the present invention.

As shown in FIG. 1, a contour shape recognition method includes the following procedures.

Figure 2:
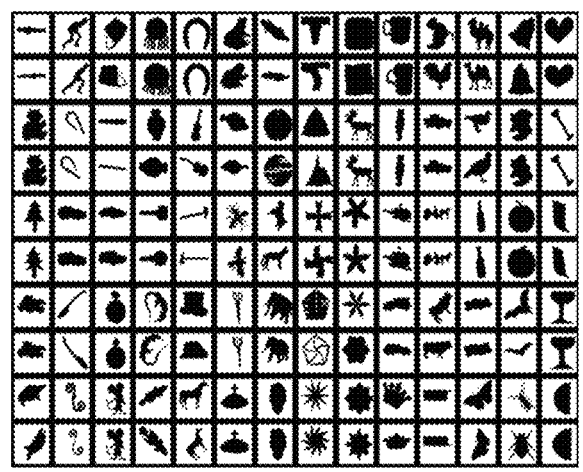
FIG. 2 is a specific example of a target shape in a contour shape recognition method according to the present invention.

1. As shown in FIG. 2, the total number of samples in a contour shape set is 1400, with a total of 70 shape categories, and each shape category includes 20 samples. Half of the samples in each shape category are randomly selected and incorporated into a training set, and the remaining half is incorporated into a testing set, resulting in a total of 700 training samples and 700 testing samples. Each shape sample is composed of two-dimensional coordinates of 100 contour sampling points. A shape sample S is taken as an example:

$$S=\{p_x(i),p_y(i)|i\in[1,100]\},$$

Wherein $p_x(i),p_y(i)$ indicates coordinates of a contour sampling point p(i) in a two-dimensional plane.

Figure 3:
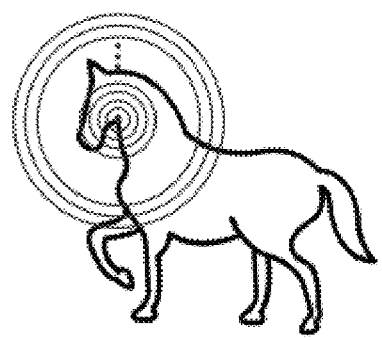
FIG. 3 is a schematic diagram of a full-scale space in a contour shape recognition method according to the present invention.
Figure 4:
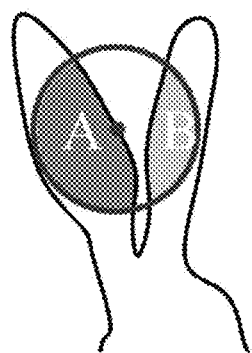
FIG. 4 is a schematic diagram of a target shape cropped by a preset scale in a contour shape recognition method according to the present invention.

2. As shown in FIG. 3, the total number of scales in the full-scale space is set to 100, and based on the coordinates of each contour point, the normalized area, arc length and barycentric distance of each contour point corresponding to each layer of scale are calculated as follows:

making a preset circle $C_1(i)$ with an initial radius $$r_1 = \frac{\sqrt{S_0}}{2}$$

by taking a contour sampling point p(i) as a circle center, i.e., a target contour point, the preset circle being an initial semi-global scale of the target contour point. After the preset circle $C_1(i)$ is acquired according to the above steps, a part of the target shape would necessarily fall within the preset circle, as schematically shown in FIG. 4. If the part of the target shape that falls within the preset circle is a separate region, the separate region is a region that has a direct connection relationship with the target contour point p(i), and is denoted as $Z_1(i)$. If the part of the target shape that falls within the preset circle is divided into several mutually disconnected regions, such as regions A and B as shown in FIG. 4, a region having the target contour point p(i) located on the contour thereof is determined as a region that has a direct connection relationship with the target contour point p(i), and is denoted as $Z_1(i)$. On this basis, an area of the region $Z_1(i)$, which has a direct connection relationship with the target contour point p(i), in the preset circle $C_1(i)$ is denoted as $s_1^*$, then:

$$s_1^*(i)=\int_{C_1(i)} B(Z_1(i),x)dx,$$

wherein $B(Z_1(i), x)$ is an indicator function, which is defined as:

$$B(Z_1(i),x) = \begin{cases} 1, & \text{if } x \text{ is inside } Z_1(i) \\ 0, & \text{if } x \text{ is outside } Z_1(i) \end{cases},$$

a ratio of the area of $Z_1(i)$ to the area of the preset circle $C_1(i)$ is used as an area parameter $s_1(i)$ for a multiscale invariant descriptor of the target contour point p(i):

$$s_1(i) = \frac{s_1^*(i)}{(\pi r_1^2)},$$

and the value range of $s_1(i)$ should be between 0 and 1.

In the case of calculating the barycenter of a region having a direct connection relationship with the target contour point p(i), it specifically includes averaging the coordinate values of all pixel points in the region to acquire a result that is the coordinate values of the barycenter of the region. This process can be expressed as:

$$w_1(i) = \frac{\int_{C_1(i)} B(Z_1(i), x)x dx}{\int_{C_1(i)} B(Z_1(i), x)dx},$$

wherein $w_1(i)$ indicates the barycenter of the area.

Calculating a distance $c_1^*(i)$ between the target contour point p(i) and the barycenter $w_1(i)$ can be expressed as:

$$c_1^*(i)=\|p(i)-w_1(i)\|,$$

a ratio of $c_1^*(i)$ to the radius of the preset circle $C_1(i)$ of the target contour point p(i) is used as a barycenter parameter $c_1(i)$ of the multiscale invariant descriptor of the target contour point p(i):

$$c_1(i) = \frac{c_1^*(i)}{r_1},$$

and the value range of $c_1(i)$ should be between 0 and 1.

Figure 5:
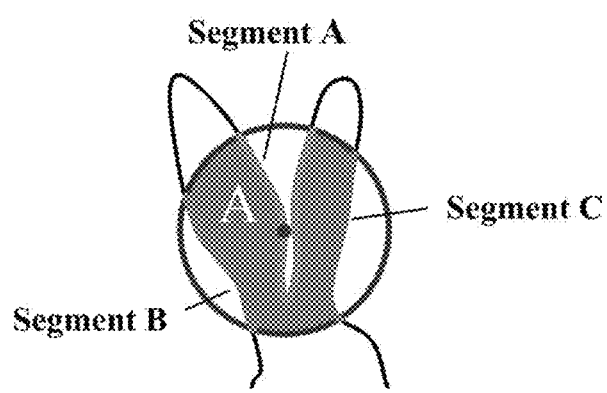
FIG. 5 is a schematic diagram of a target shape segmented by a preset scale in a contour shape recognition method according to the present invention.

After the preset circle is acquired according to the above steps, one or more arc segments would necessarily fall within the preset circle after the contour of the target shape is cut by the preset circle, as shown in FIG. 5. If the target shape has only one arc segment falling within the preset circle, the arc segment is determined as an arc segment that has a direct connection relationship with the target contour point. If the target shape has a plurality of arc segments falling within the preset circle, such as a segment A, a segment B and a segment C shown in FIG. 5, the arc segment where the target contour point p(i) is located is determined as an arc segment that has a direct connection relationship with the target contour point p(i), namely, the segment A in FIG. 5. On this basis, the length of an arc segment, which has a direct connection relationship with the target contour point p(i), in the preset circle $C_1(i)$ is denoted as $l_1^*(i)$, and the ratio of $l_1^*(i)$ to the circumference of the preset circle $C_1(i)$ is used as an arc length descriptor $l_1(i)$ of the target contour point p(i):

$$l_1(i) = \frac{l_1^*(i)}{(2\pi r_1)},$$

and the value range of $l_1(i)$ should be between 0 and 1.

Based on the above steps, the feature function of the shape sample S at the semi-global scale having a scale label k=1 and the initial radius $$r_1 = \frac{\sqrt{S_0}}{2}$$

is calculated:

$$M_1=\{s_1(i),l_1(i),c_1(i)|i\in[1,100]\},$$

The feature functions calculated at this layer of scale are stored into a feature vector.

Figure 6:
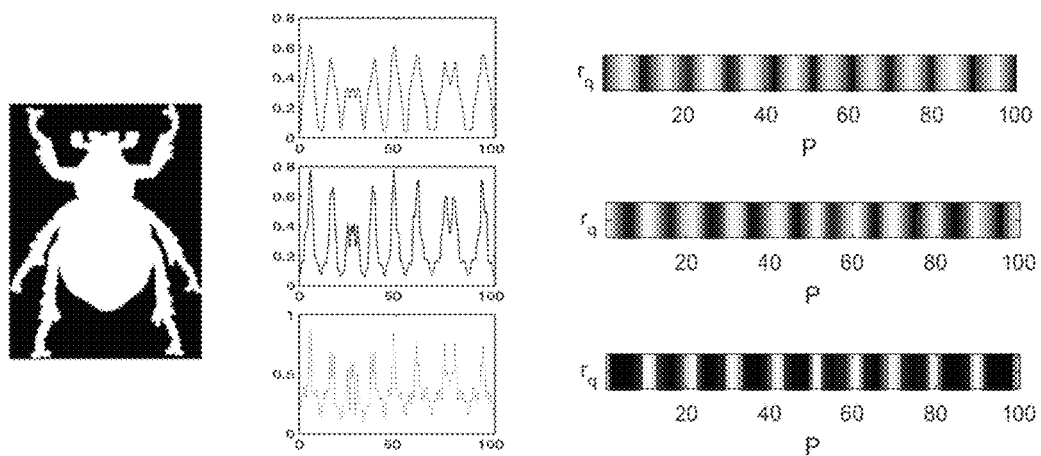
FIG. 6 is a feature vector of a target shape at a single scale in a contour shape recognition method according to the present invention.

3. As shown in FIG. 6, the respective feature vectors at 100 scales in the full-scale space are calculated respectively, and for the $k^{th}$ scale label, the radius $r_k$ of the circle $C_k(i)$ is set:

$$r_k = \frac{\sqrt{S_0}}{2} \times \frac{100-(k-1)}{100}.$$

That is, in the case of an initial scale k=1, $$r_1 = \frac{\sqrt{S_0}}{2},$$

and thereafter, the radius $r_k$ is reduced 99 times at an equal amplitude by taking one pixel as a unit, until reaching the smallest scale k=100. The feature functions of the shape sample S in the full-scale space are obtained by calculation:

$$M=\{s_k(i), l_k(i), c_k(i) k \in [1,100], i \in [1,100]\}.$$

Figure 7:
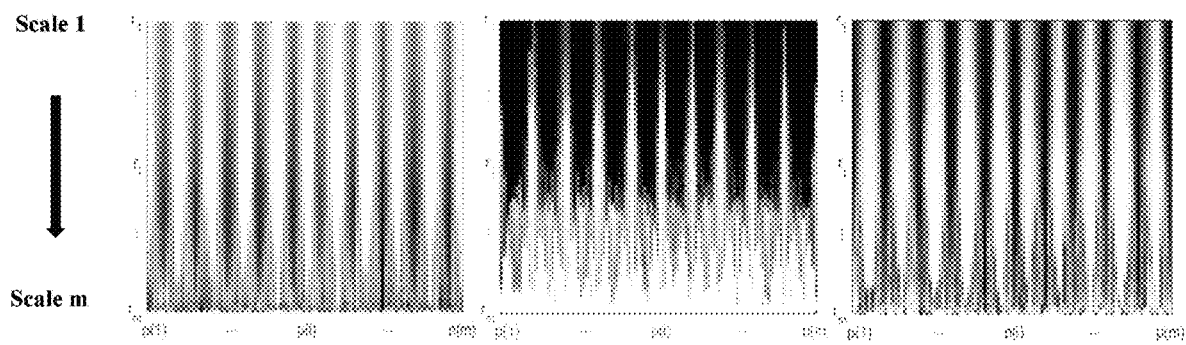
FIG. 7 is a feature matrix of a target shape in a full-scale space in a contour shape recognition method according to the present invention.

4. As shown in FIG. 7, the feature vectors at the 100 scales in the full-scale space are combined, in the order of scales, into three feature matrices in the full-scale space:

$$G=\{s,l,c\},$$

wherein s, l, c each indicate a grayscale matrix with a size of m×n.

Figure 8:
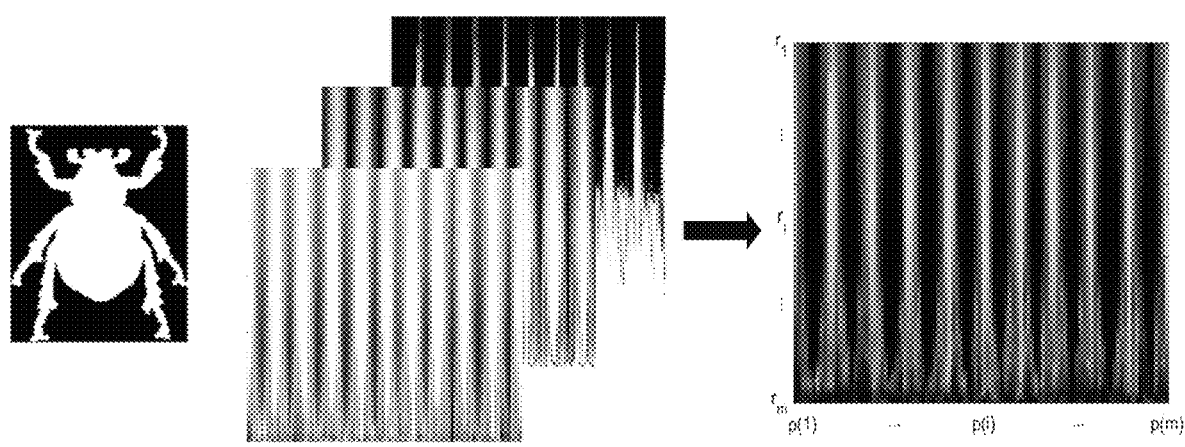
FIG. 8 is a feature tensor of a target shape in a full-scale space in a contour shape recognition method according to the present invention.

5. As shown in FIG. 8, the three types of grayscale map representations of the shape sample are synthesized, as the three channels of RGB, into a color feature representation image, which acts as tensor representation $T_{m \times n \times 3}$ of the shape sample S:
wherein $$\begin{Bmatrix} T_{m \times n \times 1} = s_{m \times n} \\ T_{m \times n \times 2} = l_{m \times n} \\ T_{m \times n \times 3} = c_{m \times n} \end{Bmatrix}.$$

Figure 9:
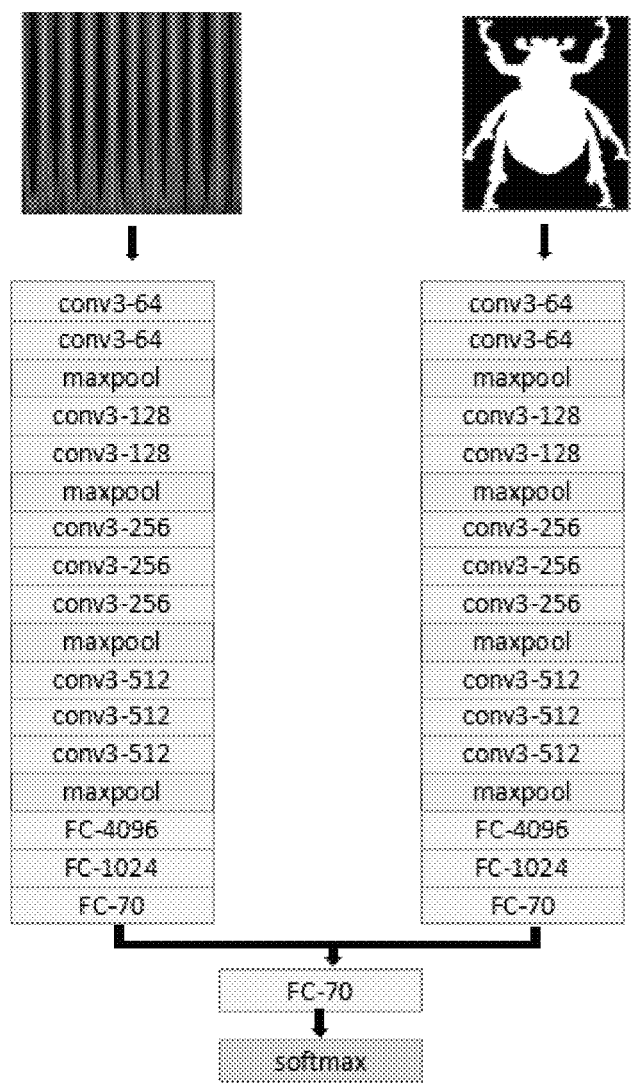
FIG. 9 is a diagram showing a model structure of a two-stream convolutional neural network in a contour shape recognition method according to the present invention.

6. A two-stream convolutional neural network is constructed, including a two-stream input layer, a pre-training layer, fully connected layers, and an output layer. The present invention normalizes the size of an original contour shape to 100*100. Then, both the original shape and its corresponding feature representation image are simultaneously input into a two-stream convolutional neural network structure model for training. In the present invention, an sgd optimizer is used; a learning rate is set to 0.001; a delay rate is set to 1e-6; a cross entropy is selected as a loss function; the weight of a two-stream feature is set to 1:1; softmax is selected as a classifier; and 128 is selected as the batch size. As shown in FIG. 9, the pre-training layer is composed of the first four modules of a VGG16 network model, and parameters acquired after the four modules are trained in an imagenet data set are used as initialization parameters, and three fully connected layers are connected after the pre-training layer.

In the pre-training layer, a first module specifically comprises two convolution layers and one maximum pooling layer, wherein each of the convolution layers has 64 convolution kernels, with a size of 3×3, and the pooling layer has a size of 2×2; a second module specifically comprises two convolution layers and one maximum pooling layer, wherein each of the convolution layers has 128 convolution kernels, with a size of 3×3, and the pooling layer has a size of 2×2; a third module specifically comprises three convolution layers and one maximum pooling layer, wherein each of the convolution layers has 256 convolution kernels, with a size of 3×3, and the pooling layer has a size of 2×2; a fourth module specifically comprises three convolution layers and one maximum pooling layer, wherein each of the convolution layers has 512 convolution kernels, with a size of 3×3, and the pooling layer has a size of 2×2. The calculation formula for each layer of convolution is:

$$C_O = \phi_{relu}(W_C \cdot C_I + \theta_C).$$

wherein $\phi_{relu}$ is a relu activation function, $\theta_C$ is a bias vector of the convolutional layer, $W_C$ is a weight of the convolutional layer, $C_I$ is an input of the convolutional layer, and $C_O$ is an output of the convolutional layer.

A module of the fully connected layers specifically includes three fully connected layers, wherein a first fully connected layer contains 4096 nodes, a second fully connected layer contains 1024 nodes, a third fully connected layer contains 70 nodes. The calculation formula for the first two fully connected layers is:

$$F_O = \phi_{tan\ h}(W_F \cdot F_I + \theta_F),$$

wherein $\phi_{tan\ h}$ is a tan h activation function, $\theta_F$ is a bias vector of each of the fully connected layers, $W_F$ is a weight of each of the fully connected layers, $F_I$ is an input of each of the fully connected layers, and $F_O$ is an output of each of the fully connected layers:

the last fully connected layer is an output layer, which has an output calculated with a formula as follows:

$$Y_O = \phi_{softmax}(W_Y \cdot Y_I + \theta_Y),$$

wherein $\phi_{softmax}$ is a softmax activation function, $\theta_Y$ is a bias vector of the output layer, $W_Y$ is a weight of the output layer, $Y_I$ is an input of the output layer, and $Y_O$ is an output of the output layer; and each neuron of the output layer represents one corresponding shape category.

7. All training samples are input into the two-stream convolutional neural network to train the two-stream convolutional neural network model; the test sample is input into the trained two-stream convolutional neural network model; and a shape category corresponding to a maximum value among output vectors is determined as a shape type of the test sample, thereby achieving the classified recognition of the shape.

Although the present invention is illustrated in detail with reference to the foregoing embodiments, those skilled in the art would also have been able to make modifications on the technical solutions recorded in the foregoing embodiments, or make equivalent replacement on some of the technical features therein. Any modifications, equivalent replacements, improvements, etc. made within the spirit and principle of the present invention shall be incorporated within the protection scope of the present invention.

What is claimed is:

1. A contour shape recognition method, comprising the following steps:
   step 1, sampling and extracting salient feature points of a contour of a shape sample;
   step 2, calculating a shape feature function of the shape sample at a semi-global scale by using three types of shape descriptors;
   step 3, dividing the scale with a single pixel as a spacing to acquire a shape feature function in a full-scale space;
   step 4, storing shape feature function values at various scales into a matrix to acquire three types of shape feature grayscale map representations of the shape sample in the full-scale space;
   step 5, synthesizing the three types of shape feature grayscale map representations of the shape sample, as three channels of RGB, into a color feature representation image;
   step 6, constructing a two-stream convolutional neural network by taking the shape sample and the color feature representation image as inputs at the same time; and step 7, training the two-stream convolutional neural network, and inputting a test sample into a trained network model to achieve classified recognition of the contour shape.

2. The method for recognizing the contour shape according to claim 1, wherein in step 1, extracting the salient feature points of the contour of the shape sample is that:

the contour of each shape sample is composed of a series of sampling points, and for any shape sample S, $$S=\{p_x(i),p_y(i)|i\in[1,n]\},$$

wherein $p_x(i)$, $p_y(i)$ indicates coordinates of a contour sampling point p(i) in a two-dimensional plane, and n indicates the length of the contour;

the salient feature points are extracted by evolving a contour curve of the shape sample, and during each evolution process, a point that contributes the least to target recognition is deleted, wherein the contribution of each point p(i) is defined as:

$$K(i) = \frac{B(i) \cdot b(i, i-1) \cdot b(i, i+1)}{(b(i, i-1) + b(i, i+1))},$$

wherein b(i,i−1) indicates the length of a curve between points p(i) and p(i−1), b(i,i+1) indicates the length of a curve between points p(i) and p(i+1), B(i) indicates an angle between a line segment p(i)p(i−1) and a line segment p(i)p(i+1), the length b is normalized according to the perimeter of the contour, and the larger the value of K(i), the greater the contribution of the point p(i) to a shape feature;

in order to avoid extracting too many or too few salient feature points of the contour, a region-based adaptive end function F(t) is introduced:

$$F(t) = \frac{n_0 \sum_{i=1}^{t} |S_i - S_{i-1}|}{S_0},$$

wherein $S_0$ is the area of an original shape, $S_t$ is an area resulting from t times evolutions, and $n_0$ indicates the total number of points on the contour of the original shape; and after the value of the end function F(t) exceeds a set threshold, extracting the salient feature points of the contour ends.

3. The method for recognizing the contour shape according to claim 2, wherein in step 2, a method for calculating the shape feature function of the shape sample in the semi-global scale specifically comprises:

using three types of shape descriptors M:

$$M=\{s_k(i),l_k(i),c_k(i)|k\in[1,m],i\in[1,n]\},$$

wherein $s_k$, $l_k$, $c_k$ are three invariants, namely, a normalized area s, a normalized arc length l, and a normalized barycentric distance c, at a scale k, k is a scale label, and in is the total number of scales; defining descriptors of the three shape invariants respectively:

making a preset circle $C_1(i)$ with an initial radius $$r_1 = \frac{\sqrt{S_0}}{2}$$

by taking the contour sampling point p(i) as a circle center, i.e., a target contour point, wherein the preset circle is an initial semi-global scale of the target contour point; after the preset circle $C_1(i)$ is acquired, calculating the three types of shape descriptors as follows:

in the case of calculating a $s_1(i)$ descriptor, denoting the area of a region $Z_1(i)$, which has a direct connection relationship with the target contour point p(i), in the preset circle $C_1(i)$ as $s_1^*(i)$, then:

$$s_1^*(i)=\int_{C_1(i)}B(Z_1(i),x)dx,$$

wherein $B(Z_1(i),x)$ is an indicator function, which is defined as $$B(Z_1(i), x) = \begin{cases} 1, \text{ if } x \text{ is inside } Z_1(i) \\ 0, \text{ if } x \text{ is outside } Z_1(i) \end{cases},$$

a ratio of the area of $Z_1(i)$ to the area of the preset circle $C_1(i)$ is used as an area parameter $s_1(i)$ for a multiscale invariant descriptor of the target contour point p(i):

$$s_1(i) = \frac{s_1^*(i)}{(\pi r_1^2)},$$

wherein a value range of $s_1(i)$ should be between 0 and 1;

when calculating a $c_1(i)$ descriptor, firstly calculating a barycenter of a region having a direct connection relationship with the target contour point p(i), to be specific, averaging coordinate values of all pixel points in the region, and the obtained result is the coordinate values of the barycenter of the region, which can be expressed as:

$$w_1(i) = \frac{\int_{C_1(i)} B(Z_1(i), x)xdx}{\int_{C_1(i)} B(Z_1(i), x)dx},$$

wherein $w_1(i)$ indicates the barycenter of the region, then, calculating a distance $c_1^*(i)$ between the target contour point p(i) and the barycenter $w_1(i)$, which can be expressed as, $$c_1^*(i)=\|p(i)-w_1(i)\|,$$

finally, using a ratio of the radius of $c_1^*(i)$ to the radius of the preset circle $C_1(i)$ of the target contour point p(i) as a barycenter parameter $c_1(i)$ of the multiscale invariant descriptor of the target contour point p(i):

$$c_1(i) = \frac{c_1^*(i)}{r_1},$$

wherein the value range of $c_1(i)$ should be between 0 and 1;

when calculating a $l_1(i)$ descriptor, denoting the length of an arc segment which is in the preset circle $C_1(i)$ and has a direct connection relationship with the target contour point p(i) as $l_1^*(i)$, and using a ratio of $l_1^*(i)$ to a circumference of the preset circle $C_1(i)$ as an arc length descriptor $l_1(i)$ of the target contour point p(i):

$$l_1(i) = \frac{l_1^*(i)}{(2\pi r_1)},$$

wherein the value range of $l_1(i)$ should be between 0 and 1; and calculating to acquire the following shape feature function of the shape sample S at the semi-global scale having a scale label k=1 and an initial radius $$r_1 = \frac{\sqrt{S_0}}{2}:$$

$M_1 = \{s_1(i), l_1(i), c_1(i) | i \in [1,n]\}$.

4. The method for recognizing the contour shape according to claim 3, wherein in step 3, a method for calculating the shape feature function of the shape sample in the full-scale space specifically comprises:

selecting a single pixel as a continuous scale change spacing in the full-scale space since a digital image takes one pixel as the smallest unit, that is, for a $k^{th}$ scale label, setting a radius $r_k$ of a circle $C_k(i)$:

$$r_k = \frac{\sqrt{S_0}}{2} \times \frac{m*(k-1)}{m},$$

that is, in the case of an initial scale k=1, $$r_1 = \frac{\sqrt{S_0}}{2},$$

and thereafter, reducing the radius $r_k$ for m−1 times at an equal amplitude by taking one pixel as a unit, until reaching the smallest scale k=m; and calculating to acquire the shape feature functions of the shape sample S at all scales:

$M = \{s_k(i), l_k(i), c_k(i) | k \in [1,m], i \in [1,n]\}$.

5. The method for recognizing the contour shape according to claim 4, wherein in step 4, the shape feature functions at various scales are respectively stored into the matrix, and are combined in a continuous scale change order to acquire the three types of shape feature grayscale map representations of the shape sample in the full-scale space:

$G = \{s, l, c\}$ wherein s, l, c each indicate a grayscale matrix with a size of m×n.

6. The method for recognizing the contour shape according to claim 5, wherein in step 5, the three types of shape feature grayscale map representations of the shape sample are synthesized, as the three channels of RGB, into a color feature representation image, which acts as tensor representation $T_{m \times n \times 3}$ of the shape sample S, wherein $$\begin{cases} T_{m \times n \times 1} = s_{m \times n} \\ T_{m \times n \times 2} = l_{m \times n} \\ T_{m \times n \times 3} = c_{m \times n} \end{cases}.$$

7. The method for recognizing the contour shape according to claim 6, wherein in step 6, a structure for constructing the two-stream convolutional neural network comprises a two-stream input layer, a pre-training layer, fully connected layers and an output layer, wherein the pre-training layer is composed of the first four modules of a VGG16 network model, and parameters acquired after the four modules are trained in an imagenet data set are used as initialization parameters, and three fully connected layers are connected after the pre-training layer;

in the pre-training layer, a first module specifically comprises two convolution layers and one maximum pooling layer, wherein each of the convolution layers has 64 convolution kernels, with a size of 3×3, and the pooling layer has a size of 2×2; a second module specifically comprises two convolution layers and one maximum pooling layer, wherein each of the convolution layers has 128 convolution kernels, with a size of 3×3, and the pooling layer has a size of 2×2; a third module specifically comprises three convolution layers and one maximum pooling layer, wherein each of the convolution layers has 256 convolution kernels, with a size of 3×3, and the pooling layer has a size of 2×2; a fourth module specifically comprises three convolution layers and one maximum pooling layer, wherein each of the convolution layers has 512 convolution kernels, with a size of 3×3, and the pooling layer has a size of 2×2; a calculation formula for each convolution layer is:

$C_O = \phi_{relu}(W_C \cdot C_I + \theta_C)$, wherein $\phi_{relu}$ is a relu activation function, $\theta_C$ is a bias vector of the convolutional layer, $W_C$ is a weight of the convolutional layer, $C_I$ is an input of the convolutional layer, and $C_O$ is an output of the convolutional layer; a module of the fully connected layers specifically comprises three fully connected layers, wherein a first fully connected layer contains 4096 nodes, a second fully connected layer contains 1024 nodes, a third fully connected layer contains N nodes, with N representing the number of types contained in a sample data set, and a calculation formula for the first two fully connected layers is:

$F_O = \phi_{tan\ h}(W_F \cdot F_I + \theta_F)$, wherein $\theta_{tan\ h}$ is a tan h activation function, $\theta_F$ is a bias vector of the fully connected layers, $W_F$ is a weight of the fully connected layers, $F_I$ is an input of the fully connected layers, and $F_O$ is an output of the fully connected layers;

the last fully connected layer is an output layer, has an output calculated with a formula as follows:

$Y_O = \phi_{softmax}(W_Y \cdot Y_I + \theta_Y)$, wherein $\phi_{softmax}$ is a softmax activation function, $\theta_Y$ is a bias vector of the output layer, $W_Y$ is a weight of the output layer, $Y_I$ is an input of the output layer, and $Y_O$ is an output of the output layer; and each neuron of the output layer represents a corresponding shape category.

8. The method for recognizing the contour shape according to claim 7, wherein in step 7, a method for achieving classified recognition of the contour shape specifically comprises: inputting all training samples into the two-stream convolutional neural network to train the two-stream convolutional neural network model; inputting the test sample into the trained two-stream convolutional neural network model; and determining a shape category, corresponding to a maximum value among output vectors, as a shape type of the test sample, thereby achieving the classified recognition of the contour shape.

* * * * *